United States Patent [19]

Wood et al.

[11] Patent Number: 4,618,400
[45] Date of Patent: Oct. 21, 1986

[54] WASTEPAPER DEINKING PROCESS

[75] Inventors: Donald L. Wood; Herbert E. Fried, both of Houston, Tex.

[73] Assignee: Shell Oil Company, Houston, Tex.

[21] Appl. No.: 817,803

[22] Filed: Jan. 10, 1986

Related U.S. Application Data

[63] Continuation of Ser. No. 687,110, Dec. 28, 1984, abandoned.

[51] Int. Cl.⁴ ............................................. D21C 5/02
[52] U.S. Cl. .......................................... 162/5; 162/6; 162/7; 162/8
[58] Field of Search ................. 162/5, 6, 7, 8; 568/45; 210/758, 759

[56] References Cited

U.S. PATENT DOCUMENTS

| | | | |
|---|---|---|---|
| 2,205,021 | 6/1940 | Schuette et al. | 568/45 |
| 2,494,610 | 1/1950 | Davidson et al. | 568/45 |
| 2,565,986 | 8/1951 | Olin | 568/45 |
| 2,677,700 | 5/1954 | Jackson et al. | 568/45 |
| 3,072,521 | 1/1963 | Samuelson et al. | 162/5 |
| 3,174,900 | 3/1965 | Wyant | 568/45 |
| 4,162,186 | 7/1979 | Wood et al. | 162/5 |

*Primary Examiner*—S. Leon Bashore
*Assistant Examiner*—K. M. Hastings

[57] ABSTRACT

A method for the deinking of wastepaper which comprises converting the wastepaper to a pulp, contacting the pulp with an aqueous medium of alkaline pH containing between about 0.2 and 2 percent by weight, calculated on dry weight of the pulp, of a deinking agent which is one or a mixture of certain thiol ethoxylate compounds, and treating the resulting pulp-containing medium to remove suspended or dispersed ink. The use of a thiol ethoxylate deinking agent offers a high level of performance in such a deinking process, both from the standpoint of the overall brightness and dirt count of paper prepared from the deinked pulp. In certain specific embodiments, the invention further comprises a step for treating thiol ethoxylate containing process streams and effluents to convert the surface active deinking agent to low-foaming sulfonyl derivatives, or to degrade the deinking agent to non-surface-active matter.

8 Claims, No Drawings

WASTEPAPER DEINKING PROCESS

This is a continuation of application Ser. No. 687,110, filed Dec. 28, 1984, now abandoned.

BACKGROUND OF THE INVENTION

The present invention relates to a process for the removal of ink from printed wastepaper in the course of reclaiming the fiber content of the waste for reuse in the manufacture of new paper. More particularly, the present invention relates to an improvement in the wastepaper deinking process, provided by a specific class of surface active deinking agents.

Wastepaper has long served as a source of the raw fiber materials used in papermaking. Traditionally, fiber from wastepaper was utilized only in the production of low grade paper and paperboard products. Today, however, greater utilization of reclaimed fiber (about 25 percent of the total fiber used in papermaking) has provided incentive for taking steps to upgrade the reclaimed product. These steps include treatment to effectively remove ink from waste fibers in order to permit their use in the manufacture of high quality papers.

In the course of the conventional paper reclamation process of interest, deinking procedures include steps for converting the wastepaper to pulp and contacting the pulp with a alkaline aqueous deinking medium containing a chemical deinking agent. The physical pulping and the alkalinity of the aqueous medium cause the removal of ink from the pulp fiber and the deinking agent produces a suspension, (and/or dispersion) of the ink particles thus removed in the aqueous medium. The resulting mixture is subsequently treated to separate the suspended ink from the pulp.

The present invention centers on the use in such a deinking process of a chemical deinking agent which is an ethylene oxide adduct of a detergent-range (e.g., $C_9$ to $C_{18}$) thiol. It has been known in the paper deinking art (for example, U.S. Pat. No. 4,162,186) to employ chemical agents which are ethylene oxide adducts ("ethoxylates") of detergent-range alcohols or alkyl-substituted phenols. Although these alcohol and phenol derivatives have generally proved acceptable for use in this service, a deinking agent which is more cost-effective in its performance would be highly desirable. Moreover, the use of alcohol or alkylphenol ethoxylates suffers some disadvantage when consideration is given to all aspects of the typical deinking process. For instance, the presence of conventional surface active deinking agents in deinked pulp and other process streams may interfere with downstream processing steps and/or the quality of effluent wastewater.

SUMMARY OF THE INVENTION

It has now been found that certain thiol ethoxylate compounds are very usefully applied as deinking agents in processes for the deinking of printed wastepaper. Processes applying the thiol ethoxylate deinking agents are found to offer a high level of performance, both from the standpoint of the overall brightness and dirt (ink particle) count of papers prepared from the deinked pulp.

Accordingly, in broad terms the present invention is briefly described as a process for the deinking of wastepaper stocks, which comprises steps for a. converting the wastepaper to a pulp, b. contacting the pulp with an aqueous medium of alkaline pH containing between about 0.2 and 2 percent by weight, calculated on dry weight of the pulp, of a deinking agent which is one or a mixture of thiol ethoxylate compounds of the formula

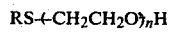

wherein R represents a $C_9$ to $C_{18}$ alkyl group and n has an average value between about 3 and 20, and c. treating the resulting pulp-containing medium to remove suspended or dispersed ink therefrom.

In certain preferred embodiments, the invention additionally comprises process steps for treatment of deinked pulp and/or aqueous process streams which contain the deinking agent. In one respect, these preferred embodiments are directed to implementing observations that process streams containing deinking agent can be treated to convert all or part of the thiol ethoxylates to corresponding sulfonyl compounds. In particularly preferred embodiments, the invention comprises a step which accomplishes both a bleaching of the pulp and a conversion to sulfonyl derivatives. It is found that at least a portion of the deinking agent is converted to these derivatives in the presence of oxidizing agents and under conditions typical of bleaching steps conventionally applied in wastepaper deinking processes. Conversion to the sulfonyl derivatives is beneficial, for instance, in order to eliminate problems associated with foaming produced by carryover of surfactant into downstream processing steps or into effluent wastewater streams. Relative to the thiol ethoxylates, the sulfonyl derivatives have a greatly reduced tendency to promote foaming in aqueous solution. In another respect, certain preferred embodiments of the invention are directed to treatment of deinked pulp and/or other process streams to accomplish a degradation of the thiol ethoxylate deinking agent and/or its sulfonyl derivatives into non-surface-active matter. Such embodiments provide for one or more steps in which the surfactant-containing process stream is contacted with an oxidizing agent under specified conditions of pH and temperature. Conversion of deinking agent to non-surface-active matter may be applied, for instance, to facilitate its removal from pulp fibers or to improve the quality of process effluent wastewater streams.

DESCRIPTION OF THE PREFERRED EMBODIMENTS

The present invention is generally applicable to the deinking of the common wastepaper stocks, such as newsprint, book, ledger, and magazine, and also to practices and procedures conventionally employed for their processing. As a rule, any such process necessarily comprises at least three principal steps: the first, a step to reduce the wastepaper feed to pulp, the second, a contact between the pulp and an alkaline aqueous medium containing the deinking agent to produce a suspension or dispersion of the ink, and, the third, a treatment of the resulting pulp containing medium to remove suspended or dispersed ink particles therefrom.

In a most important aspect, the invention centers upon the composition and performance of the deinking agent. For purposes of the invention, the deinking agent is necessarily one or more oxyethylene adducts (or ethoxylates) of higher thiols. Such thiol ethoxylates are represented by the formula

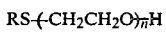
$$RS(CH_2CH_2O)_{\overline{n}}H \qquad (I)$$

where R is an alkyl group and n is an integer. Thiol ethoxylates suitable for use in the invention are characterized by an acyclic alkyl R group having a carbon number in the range from about 9 to 18. Preference has been observed for deinking agents in which the R group has a carbon number from about 10 to 16 and particularly for a deinking agent with an R group in the carbon number range from about 11 to 15. The R group may be either linear (straight chain) or branched and either primary, secondary or tertiary. Preference can be expressed for substantially linear secondary R groups and for branched tertiary R groups.

Another necessary, although less critical characterization of the deinking agent is a requirement for an average oxyethylene adduct number (i.e., value of n in formula I) which is in the range from about 3 to 20. An average adduct number of about 5 to 15 is typically preferred, while an average adduct number in the range from about 7 to 12 is considered most preferred.

It is generally most convenient to express this adduct number in terms of an average value. Processes commonly employed to prepare thiol ethoxylates result in a mixture of ethoxylated products with the individual ethoxylate molecules having several different adduct numbers. Mixtures of thiol ethoxylate compounds having different adduct numbers and/or different R groups are very useful.

Thiol ethoxylates suitable for use as deinking agents in the practice of the invention are known in the art, for instance as textile wetting and washing agents and as spermicidal agents. Their preparation is typically, but by no means necessarily accomplished by an addition reaction between ethylene oxide and a thiol reactant, comprising one or more thiols (mercaptans) of the formula RS where R is as described for formula I, in the presence of a catalyst. The addition of ethylene oxide is continued until the desired average adduct number (n value) is achieved for the product. Suitable catalysts for this ethoxylation reaction include the alkali metals and their oxides, hydroxides, and thiolates. Procedures and conditions for thiol ethoxylate preparation in such a manner are detailed in U.S. Pat. No. 2,205,021, U.S. Pat. No. 2,494,610, U.S. Pat. No. 2,565,986, and U.S. Pat. No. 3,174,900, the relevant teachings of which are incorporated herein by this reference.

The invention applies the thiol ethoxylate deinking agent to wastepaper which is necessarily in the form of a pulp, that is, to wastepaper which has first been substantially reduced to the individual fibers. Pulping is very suitably conducted using any of the various conventional processes and equipment designed for this purpose. Most conveniently, the wastepaper process feedstock is treated in a device known as a "hydropulper", which produces a slurry of the fibers in water.

After the pulping step, the resulting fibers are contacted in an aqueous medium with the deinking agent. This contact step may suitably be conducted in the pulping equipment, for instance, by simply adding deinking agent and caustic to the aqueous slurry of the hydropulper. Alternatively, the contact may be carried out using separate processing equipment which provides for agitation of the aqueous pulp slurry. For the contact step, the pulp is present in the aqueous medium in a quantity typically, but not necessarily, between about 0.5 and 5.0 percent by weight (%w), calculated as the dry weight of the wastepaper feed relative to total weight of the slurry formed. In preferred practices the slurry contains between about 1 and 4%w pulp fiber. The quantity of deinking agent present in the slurry is very suitably between about 0.2 and 2.0%w, calculated on dry fiber weight. Preference may be expressed for a quantity of deinking agent that is between about 0.5 and 1.5%w, while a quantity of about 0.75 to 1.2%w is considered most preferred.

During contact between pulp fiber and deinking agent it is further necessary to the invention that the aqueous contact medium be maintained at alkaline pH. A pH value greater than about 7 is considered preferred, a pH between about 7 and 13 more preferred and a pH between about 8 and 12 is generally most preferred. The alkalinity is typically maintained by addition to the aqueous contact medium of a base, particularly caustic or sodium silicate in a quantity between about 1 and 4%w calculated on dry weight of the pulp fiber.

In addition to water, pulp, base, and deinking agent, the contact slurry may further suitably contain other substances conventionally employed in deinking processes, e.g., brighteners, solvents, antifoam agents, and water softeners. For reasons addressed hereinbelow, the deinking step slurry does not suitably contain any significant quantity of bleach. If desired, other deinking agents may be present in addition to the specified thiol ethoxylates. However, the use of additional deinking agents is neither necessary nor preferred.

Processing of the pulp slurry during contact with the deinking agent is preferably carried out at elevated temperature, particularly a temperature between about 40° and 100° C. The invention has been found to be particularly effective at a temperature in the range from about 45° to 80° C., while a contact temperature in the range from about 50° and 75° C. is considered optimal.

The time for which contact is maintained between the wastepaper pulp and the aqueous deinking medium is not critical for purposes of the invention. However, a contact time greater than about 10 minutes is preferred from the standpoint of deinking performance. From the standpoint of the process efficiency, preference may be stated for a contact time that is between about 20 minutes and two hours, while contact for between about 30 and one hour is considered most preferred.

Contact between pulp fiber and deinking agent in the alkaline aqueous medium accomplishes the dispersion of ink particles into the medium. A further treatment of the pulp-containing mixture is then necessary to remove suspended or dispersed ink particles therefrom. For this purpose the invention suitably makes use of techniques commonly applied in deinking practices, including those treatments known as washing and flotation. In washing, the ink particles are rinsed from the pulp mixture by contact with a flow of water, usually a countercurrent flow relative to the pulp. Among the devices commercially utilized for pulp washing and suitable for service in the practice of the invention mention may be made of the sidehill screen, the gravity decker or drum washer, the inclined screw extractor, the screw press and centrifugal cleaners of various designs. Flotation is an alternative to washing in which air is bubbled through the pulp. Ink particles selectively adhere to the bubbles and float to the surface, forming a froth which is then skimmed off.

It will be understood that in addition to pulping, contact, and ink removal steps described herein, the invention may be practiced using other process steps as are employed in wastepaper reclamation operations in general and deinking in particular.

Once it has been introduced into the deinking process of the invention, the deinking agent is thereafter present, in lesser or greater degree, in downstream process steps. Even in relatively small quantity, the surface active deinking agent may then interfere with subsequent steps for pulp treating or paper making. Conventional surfactant deinking agents are also a principal source of contamination in effluent wastewater streams from the process. The use, according to the invention, of thiol ethoxylate deinking agents on the other hand, provides opportunity for elimination of surfactant contaminants from process streams. Unlike the alcohol and alkylphenol ethoxylates, thiol ethoxylates may be readily converted to low-foaming derivatives. If desired, these derivatives can also be chemically degraded into non-surface active residues.

Of particular interest is the conversion and/or degradation of the thiol ethoxylates which can be accomplished upon contact with common oxidizing agents. The thiol ethoxylates are known to be readily converted to both sulfinyl $RS(O)-(CH_2CH_2O)_{\overline{x}}H$ and sulfonyl $RS(O)_2-(CH_2CH_2O)_{\overline{x}}H$ derivatives upon contact with common oxidizing agents under mild conditions such as those which are encountered in the typical deinking process. Such conversion is, for example, essentially instantaneous in an aqueous medium treated with sodium hypochlorite at ambient or greater temperature. It has further now been observed that under more severe conditions (e.g., at a temperature of at least about 75° C., particularly at least about 85° C. and most particularly at least about 95° C., and at a pH of at least about 12.0, particularly at least about 13.0 and most particularly at least about 13.5) some or all of the sulfonyl derivatives then undergo degradation to simple polyethylene glycols and mono glycol sulfonyl ethers (for example of the formula $RS(O)_2CH_2CH_2OH$), which are in each case effectively non-surface-active.

In the context of the invention, advantage may be taken of these properties of the deinking agent in several ways. For instance, in a particularly preferred embodiment, the invention comprises a step for treating of the pulp following a deinking step utilizing a thiol ethoxylate deinking agent to both bleach the pulp and to convert the thiol ethoxylates to sulfonyl derivatives. The bleaching step may suitably be carried out using bleaching/oxidizing agents (e.g., alkali metal hypochlorites, hydrogen peroxide, organic and inorganic peracids, and chlorine dioxide) and procedures and conditions conventionally employed in pulp bleaching. Bleaching of deinked pulp is, for example, suitably carried out at a temperature from about 35° to 95° C., at a pH of at least about 5 in an aqueous medium having a pulp consistency of 4 to 5%w, for a period of about 20 minutes to 4 hours.

In more general embodiments, any aqueous process stream (downstream of the deinking step) or effluent may be treated with such an oxidizing agent for conversion or degradation of all or part of the deinking agent. In addition to effluent which may be simply drained from the pulp following the deinking agent contact step, thiol ethoxylate containing wastewater streams result, for example, from aqueous washing steps carried out to remove the ink, the deinking agent, and/or other process additives from the deinked pulp. Such treatment may be accomplished simply by adding and mixing the oxidizing agent into the aqueous medium containing thiol ethoxylate. As a general rule, such treatment is preferably effected at a temperature of at least about 20° C. Temperature and pH are not critical if the object of this treatment is to convert the thiol ethoxylates to sulfonyl ethoxylates. A temperature of at least about 20° C. is, however, preferred for rapid and complete action. Again, if the object is degradation of the deinking agent, the sulfonyl derivatives are subjected to a temperature of at least about 75° C. and a pH of at least about 12.0.

In still another embodiment, the deinking step mixture is so treated with an oxidizing agent prior to washing or flotation for ink removal from the pulp, to accomplish in a single step the conversion and/or degradation of all deinking agent.

Whether it is intended to convert the deinking agent to low-foaming sulfonyl derivatives or to degrade the agent to non-surface-active sulfonyl ethers, it is important that the process or effluent stream be treated with a certain minimum amount of oxidizing agent. In general, the amount of oxidizing agent must be at least one equivalent of oxidizing agent per equivalent of thiol ethoxylate. Lesser amounts of oxidizing agents leave major portions of the thiol ethoxylates unconverted or converted to sulfinyl rather then sulfonyl derivatives. Preferably, the process or effluent stream is treated with at least about two equivalents of oxidizing agent per equivalent of thiol ethoxylate.

As a further aspect of the invention, it is, however, critical that there be no introduction of bleach or other oxidizing agent into the process prior to completion of the deinking step. In other words, it is necessary that any treatment to convert the thiol ethoxylate to sulfonyl derivatives or to non-surface-active matter be conducted subsequent to the contact between deinking agent and pulp. The sulfonyl derivatives, have now been tested in deinking agent service and found to offer unacceptable performance. Accordingly, they do not come within the scope of deinking agents suitable for use in the invention.

The following examples and comparative experiments are provided to further illustrate certain preferred embodiments of the invention without limiting its broader scope.

EXAMPLES 1–4

The process of the invention was applied to a series of four experiments for the deinking of newsprint, using several different secondary thiol ethoxylates as deinking agents. The following procedures were carried out in each experiment.

Sample preparation. Newsprint was shredded by hand and mixed well. Unprinted margins of the paper were trimmed before shredding and collected for use as a blank standard.

Hydropulping. Sufficient tap water was added to 120 g of the shredded paper to bring the total volume of 1.33 liters, and borax was added to adjust pH to about 8. The paper in the mixture was then disintegrated by blending for five minutes in a commercial 4-liter blender.

Deinking. The disintegration mixture was diluted with additional tap water to bring its total volume to about 4 liters. Temperature of the added water was preadjusted to result in a temperature of 70°–75° C. for the total mixture. The total mixture was then divided into four portions, each 1 liter in volume and containing 20 g of pulp (i.e., a 2% consistency). To each portion was then added borax to maintain the desired pH of about 8 and 0.2 g of the deinking agent (1%w calculated on weight of dry paper). Deinking was carried out for thirty minutes with agitation (mechanical stirring) at 40°-45° C.

Washing. Each deinked pulp solution was next drained onto a #20 ASTM sieve. Pulp collected in the sieve was rinsed under running tap water and then transferred to a beaker containing about 500 ml water. The beaker contents were stirred by hand for a few minutes and then drained onto the sieve. These washing procedures were twice repeated (a total of three washings).

Following the washing step, the pulp mixture was diluted to a 1.5%w consistency and treated with 0.2%w sodium hydrosulfite at a pH of 4.5-5.0 (adjusted with dilute HCl) at room temperature for 15 minutes. This sodium hydrosulfite treatment helps prevent degradation of pulp fiber. After this treatment step, the mixture was again drained and the pulp collected.

Paper making. Deinking process performance was measured by making paper from the deinked pulp and analyzing the paper for brightness and dirt count. For this purpose, the collected pulp was transferred to a container and tap water added to bring volume up to one liter. The one liter pulp solution was dispersed (250 ml of solution and 5 g of pulp at a time) in 7 liter of tap water in a TMI TAPPI (Technical Association of the Pulp and Paper Industry) Standard Sheet Machine. In the machine, pulp was deposited forming a wet sheet, while water drained rapidly. The sheet thus formed was covered with a piece of thick wet filter paper followed by a piece of thick dry filter paper and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for 24 hours.

The papers ("handsheets") thus prepared were analyzed for brightness, in comparison to handsheets prepared from the blank standard using the same procedures. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally the eight separate measurements for the sheet varied over a range of no more than 1.0%. Reported brightness readings were the average of the brightness results for at least three similarly processed sheets.

The handsheets were also visually inspected (eye and/or microscope) for ink ("dirt") particles. Dirt count (in ppm) was carried out according to TAPPI standard procedure T437 ppm-78, which takes into account particle size. A 5.5 cm by 5.5 cm area of the handsheet was counted to represent the total sheet. An area was counted on both sides of the sheet and the two values added. An alternate dirt count (reported in specks per gram of paper) was also obtained by counting all specks regardless of particle size. This alternative count was taken for representative areas of both sides of the sheet and divided by the weight of the handsheet (air dried).

For Example 1, these procedures were followed using as deinking agent an ethoxylate of a mixture of $C_{11}$ and $C_{12}$ (45% $C_{11}$ and 55% $C_{12}$) linear secondary alkane thiols. The thiol ethoxylate was characterized by an average oxyethylene adduct number of 8.8. Handsheets prepared by applying this deinking agent and the indicated procedures to the deinking of printed newspaper had an average brightness of 47% and dirt counts of about 20 ppm and 5 specks per gram. Effective deinking performance of the process was illustrated by comparison with results obtained applying the same procedures to the blank (unprinted) standard. Handsheets prepared by processing of the blank paper had an average brightness of 50% and dirt counts of about 15 ppm and 5 specks per gram.

For Examples 2-4, the same procedures were followed, but applying other thiol ethoxylate deinking agents in accordance with the invention. In Example 2, the deinking agent was an ethoxylate of a mixture of $C_{11}$ and $C_{12}$ linear secondary alkane thiols having an average oxyethylene adduct number of 6.9. Handsheets prepared from deinked pulp had a brightness of 43% and dirt counts of about 20 ppm and 5 specks per gram. In Example 3, the deinking agent was an ethoxylate of a mixture of $C_{13}$ and $C_{14}$ linear secondary alkane thiols having an average oxyethylene adduct number of 11.8. Handsheets prepared from the deinked pulp had a brightness of 48% and dirt counts of about 50 ppm and 10 specks per gram. In Example 4 the deinking agent was an ethoxylate of a mixture of $C_{11}$ and $C_{12}$ linear secondary alkane thiols having an average oxyethylene adduct number of 12.2. Handsheets prepared from the deinked pulp had a brightness of 47% and dirt counts of about 110 ppm and 15 specks per gram.

A series of comparative experiments, not in accordance with the invention, were carried out to compare the deinking performance of the thiol ethoxylate agents with that of other nonionic surfactants known in the art for use in this service. In a comparative example designated A the same general procedures were applied using as deinking agent an ethoxylate of a nonyl-substituted phenol having an average oxyethylene adduct number of 9.5. In a comparative example B, the procedures were followed with a deinking agent which was an ethoxylate of a mixture of $C_{12}$-$C_{15}$ linear primary aliphatic alcohols having an average oxyethylene adduct number of 9.0. In a comparative example C, the deinking procedures were followed using a deinking agent which was an ethoxylate of a mixture of $C_{14}$ and $C_{15}$ linear primary aliphatic alcohols having an average oxyethylene adduct number of 7.0.

In a second series of comparative experiments, deinking was carried out using sulfonyl ethoxylates as deinking agents, and thus not in accordance with the invention. In a comparative experiment D, the deinking agent was a sulfonyl ethoxylate corresponding to the thiol ethoxylate of Example 1. This sulfonyl ethoxylate was derived from the corresponding thiol ethoxylate by oxidation with hydrogen peroxide. In comparative experiment E, the deinking agent was a sulfonyl ethoxylate corresponding to, and derived from, the thiol ethoxylate of Example 2.

Results of the comparative experiments A-E are presented in Table I below together with the results of Examples 1-4. The tabulated brightness and dirt count data illustrate that the performance of the thiol ethoxylates as deinking agents compares favorably with that of the alcohol ethoxylates and the alkylphenol ethoxylate. Performance of the thiol ethoxylates is shown to be superior to that of the sulfonyl ethoxylates, particularly from the standpoint of dirt count.

TABLE I

| Example Or Comparative Experiment | Deinking Agent | Handsheet Brightness | Dirt Count ppm | Specks/g |
|---|---|---|---|---|
| 1 | Thiol Ethoxylate | 47 | 20 | 5 |
| 2 | Thiol Ethoxylate | 43 | 20 | 5 |
| 3 | Thiol Ethoxylate | 48 | 50 | 10 |
| 4 | Thiol Ethoxylate | 47 | 110 | 15 |
| A | Alkylphenol Ethoxylate | 49 | 85 | 15 |
| B | Alcohol Ethoxylate | 50 | 40 | 10 |
| C | Alcohol Ethoxylate | 48 | 25 | 5 |
| D | Sulfonyl Ethoxylate | 46 | 165 | 40 |
| E | Sulfonyl Ethoxylate | 44 | 235 | 45 |

EXAMPLES 5-8

Procedures similar to those of Examples 1-4 were applied to four additional experiments for the deinking of a mixture of newsprint and ledger, using various ethoxylates of tertiary thiols as deinking agents. The deinking step was carried out for 30 minutes at a temperature of 43° C., a pulp consistency of 3%w, a surfactant concentration of 1%w (based on weight of dry paper), and a pH of about 9 (adjusted with sodium silicate). In Example 5, the deinking agent was an ethoxylate of butylene trimer having an average oxyethylene adduct number of about 9. In Example 6, the deinking agent was an ethoxylate of propylene tetramer thiol having an average oxyethylene adduct number of about 9. In Example 7, the deinking agent was an ethoxylate of a butylene trimer having an average oxyethylene adduct number of about 12. In Example 8, the deinking agent was a commercial tertiary thiol ethoxylate having a branched $C_{12}$ R group and having an average oxyethylene adduct number of about 9.5. The results of Examples 5-8 are presented in Table II below, in terms of brightness and dirt count of handsheets prepared from the deinked pulp.

Also presented in Table II are the results of a series of comparative experiments applying the same procedures to the deinking of mixed news and ledger, using deinking agents not in accordance with practice under the invention. In comparative experiment F, the deinking agent was the same as in comparative experiment A. The deinking agent used in experiment G was an ethoxylate of a mixture of $C_{14}$ and $C_{15}$ primary linear aliphatic alcohols having an average oxyethylene adduct number of about 13. The deinking agent for comparative experiment H was the same as in comparative experiment B.

TABLE II

| Example Or Comparative Experiment | Deinking Agent | Handsheet Brightness | Dirt Count ppm | Specks/g |
|---|---|---|---|---|
| 5 | Thiol Ethoxylate | 48-49 | 17 | 30 |
| 6 | Thiol Ethoxylate | 47-49 | 15 | 27 |
| 7 | Thiol Ethoxylate | 47-48 | 9 | 61 |
| 8 | Thiol Ethoxylate | 47-48 | 21 | 60 |
| F | Alkylphenol Ethoxylate | 50-51 | 7 | 98 |
| G | Alcohol Ethoxylate | 49-50 | 7 | 9 |
| H | Alcohol Ethoxylate | 50-51 | 7 | 13 |

EXAMPLE 9

This example illustrates preferred aspects of the invention relating to treatment of deinking process streams with oxidizing agents to convert thiol ethoxylates to low-foaming derivatives.

Two solutions, A and B, were prepared by dissolving 0.07 grams of the thiol ethoxylate deinking agent described in Example 1, in 50 ml of deionized water at ambient temperature. The two solutions were placed in identical graduated cylinders and then shaken for one minute. Foam volume was measured for both solutions at 57 ml after 30 seconds and at 10 ml after 5 minutes. Three ml of a 5% aqueous solution of sodium hypochlorite bleach was then added to solution A and three ml of water was added to solution B. After two minutes each solution was shaken for 30 seconds. Foam volume was measured for solution A (containing bleaching agent) at 17.5 ml after 2 minutes and at zero ml after 5 minutes. For solution B (standard, without bleaching agent) foam volume was measured at 50 ml after 2 minutes and at 18 ml after 5 minutes.

EXAMPLE 10

This example illustrates degradation of thiol ethoxylate deinking agent to non-surface-active matter.

Into solution A prepared and treated according to Example 9, was dissolved 2.5 grams of solid sodium hydroxide. The resulting solution was shaken for one minute. Thirty seconds later, foam volume was measured at 40 ml. After 5 minutes, the solution exhibited a foam volume of 4 ml. The solution was then heated to 77° C. in a hot water bath for 15 minutes, cooled to room temperature, and then shaken for one minute. Foam volume after thirty seconds was zero ml.

Example 10 shows that both high temperature and pH are necessary to degrade the sulfonyl ethoxylates, to which the thiol ethoxylates are converted upon contact with a bleaching/oxidizing agent, to non-surface-active matter.

We claim as our invention:

1. A process for the deinking of wastepaper stocks which comprises steps for
   a. converting the wastepaper to a pulp,
   b. contacting the pulp with an aqueous medium of alkaline pH containing between about 0.2 and 2 percent by weight, calculated on dry weight of the pulp, of a deinking agent which is one or a mixture of thiol ethoxylate compounds of the formula

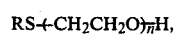
   $$RS\text{-}(CH_2CH_2O)_{\overline{n}}H,$$

wherein R represents a $C_9$ to $C_{18}$ alkyl group and n has an average value between about 3 and 20,
   c. treating the resulting pulp-containing medium to remove suspended or dispersed ink therefrom, and
   d. treating the pulp-containing aqueous medium, subsequent to step c, with an oxidizing agent at a temperature of at least about 75° C. and at a pH of at least about 12.0 to bleach the pulp and to convert all or part of the thiol ethoxylate deinking agent to non-surface-active matter.

2. A process according to claim 1, wherein the temperature is at least about 85° C. and the pH at least about 13.0.

3. A process according to claim 1, wherein the oxidizing agent is selected from the group consisting of alkali metal hypochlorites, hydrogen peroxide, organic and inorganic peracids and chlorine dioxide.

4. A process according to claim 2, wherein the oxidizing agent is selected from the group consisting of alkali metal hypochlorites, hydrogen peroxide, organic and inorganic peracids and chlorine dioxide.

5. A process for the deinking of wastepaper stocks which comprises steps for
   a. converting the wastepaper to a pulp,
   b. contacting the pulp with an aqueous medium of alkaline pH containing between about 0.2 and 2 percent by weight, calculated on dry weight of the pulp, of a deinking agent which is one or a mixture of thiol ethoxylate compounds of the formula $$RS(CH_2CH_2O)_{\overline{n}}H,$$

wherein R represents a $C_9$ to $C_{18}$ alkyl group and n has an average value between about 3 and 20,
   c. treating the resulting pulp-containing medium to remove suspended or dispersed ink therefrom, and
   d. treating process effluent wastewater containing deinking agent with an oxidizing agent at a temperature of at least 75° C. and at a pH of at least about 12 for conversion of all or part of the deinking agent to non-surface-active matter.

6. The process of claim 5, wherein the temperature is at least about 85° C. and the pH at least about 13.0.

7. A process according to claim 5, wherein the oxidizing agent is selected from the group consisting of alkali metal hypochlorites, hydrogen peroxide, organic and inorganic peracids and chlorine dioxide.

8. A process according to claim 6, wherein the oxidizing agent is selected from the group consisting of alkali metal hypochlorites, hydrogen peroxide, organic and inorganic peracids and chlorine dioxide.

* * * * *